United States Patent
Takashita et al.

(10) Patent No.: US 7,754,363 B2
(45) Date of Patent: Jul. 13, 2010

(54) METHOD AND APPARATUS FOR INSPECTING DIRECT LIQUID FUEL CELL GENERATOR, AND DIRECT LIQUID FUEL CELL GENERATOR

(75) Inventors: Masahiro Takashita, Kanagawa-ken (JP); Takashi Yamauchi, Kanagawa-ken (JP); Yoshihiko Nakano, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1010 days.

(21) Appl. No.: 11/451,382

(22) Filed: Jun. 13, 2006

(65) Prior Publication Data

US 2006/0228602 A1    Oct. 12, 2006

Related U.S. Application Data

(62) Division of application No. 10/414,155, filed on Apr. 16, 2003, now Pat. No. 7,094,485.

(30) Foreign Application Priority Data

Apr. 16, 2002 (JP) ............... 2002-113323

(51) Int. Cl.
*H01M 8/04* (2006.01)
*H01M 8/00* (2006.01)

(52) U.S. Cl. .......................... 429/23; 429/13
(58) Field of Classification Search ............. 429/13, 429/23
See application file for complete search history.

(56) References Cited

U.S. PATENT DOCUMENTS 5,156,928 A  *  10/1992  Takabayashi ................ 429/23
6,296,964 B1    10/2001  Ren et al.
6,506,513 B1    1/2003   Yonetsu et al.

* cited by examiner

*Primary Examiner*—Patrick Ryan
*Assistant Examiner*—Karie O'Neill Apicella
(74) *Attorney, Agent, or Firm*—Oblon, Spivak, McClelland, Maier & Neustadt, L.L.P.

(57) ABSTRACT

The invention provides a method for inspecting a fuel cell that can simply inspect fuel cell characteristics.

The method is an inspecting method for a direct methanol fuel cell generator comprising an anode electrode including an node catalyst layer, a cathode electrode including a cathode catalyst layer, and N pieces of cells having an electrolyte disposed between the anode electrode and the cathode electrode, for power generation by feeding an aqueous methanol solution to the anode electrode and an oxidant gas to the cathode electrode. The fuel cell generator is inspected by measuring voltage changes of the voltage V of one electromotive unit caused by generating a current density change $\Delta I$ or $-\Delta I$ (mA/cm$^2$) satisfying the condition of $0.2 \leq \Delta I \leq 5$ in a finite current density I (mA/cm$^2$) loaded on the plural electromotive units arbitrarily connected in series in the fuel cell generator under power generation during a time interval $\Delta t$ (sec) satisfying the condition of $10^{-5} \leq \Delta t \leq 0.5$.

16 Claims, 13 Drawing Sheets

METHOD AND APPARATUS FOR INSPECTING DIRECT LIQUID FUEL CELL GENERATOR, AND DIRECT LIQUID FUEL CELL GENERATOR

CROSSREFERENCE TO RELATED APLICATIONS

This application is a divisional application of U.S. application Ser. No. 10/414,155, now allowed. This application claims priority to, and incorporates herein by reference in their entireties, U.S. application Ser. No. 10/414,155, and Japanese Patent Application No. 2002-113323.

BACKGROUND OF THE INVENTION

1. Field of the Invention

The invention relates to an inspection method for a direct liquid fuel cell generator that generates electricity by supplying a liquid fuel and an oxidant, an inspection apparatus for a direct liquid fuel cell generator using the inspection method, and a direct liquid fuel cell generator comprising the inspection apparatus of the fuel cell generator.

2. Description of the Related Art

Fuel cells are generators that directly convert a chemical energy (free energy of combustion reactions) into a direct electrical energy, and are expected to have a higher conversion efficiency than thermal power generation. While power generation efficiency decreases when the scale of thermal power generation is small, power generation by the fuel cell is not decreased in small scale operation. Accordingly, the fuel cell is suitable for small scale power generation.

Among the fuel cells, developments of solid polymer electrolyte fuel cells have been accelerated in recent years as automobile power sources and domestic power sources. A gas containing hydrogen is introduced into an anode side, and oxygen gas or air is introduced into a cathode side in this solid polymer electrolyte fuel cell. An electromotive force is generated by the following reactions represented by the chemical formulae 1 and 2 at the anode and cathode sides, respectively.

Anode: $2H_2 \rightarrow 4H^+ + 4e^-$       chemical formula 1

Cathode: $O_2 + 4H^+ + 4e^- \rightarrow 2H_2O$       chemical formula 2

The equations mean that electrons and protons are formed from hydrogen by means of a catalyst within the anode. The electrons are taken out of the cell through external circuits, and are used for power generation. The protons move in the solid electrolyte membrane and arrive at the cathode, and water is generated by a reaction between the electrons, oxygen, and the protons by a catalyst within the cathode. Electric power is generated by such cell reaction.

On the other hand, a direct methanol fuel cell has been noticed in recent years. FIG. 1 shows the structure of the direct methanol fuel cell. In the direct methanol fuel cell, a proton conductive electrolyte membrane (a perfluorocarbon sulfonic acid ion exchange membrane; Nafion made by DuPont Co. is preferably used) is sandwiched between an anode electrode and a cathode electrode. Each electrode comprises a substrate and a catalyst layer which comprises a catalyst and a proton conductive electrolyte. The catalyst is usually a precious metal or an alloy of the precious metal, which is used by being supported on carbon black. The catalyst is not supported on carbon black in some cases. A Pt—Ru alloy is preferably used as catalyst at the anode side, while Pt is preferably used as catalyst at the cathode side. Methanol and water are introduced into the anode side, and oxygen gas or air is introduced into the cathode side for operation. The reactions represented by the following chemical formulae 3 and 4 occur at the anode and cathode sides, respectively.

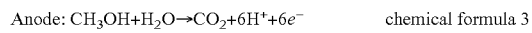

Anode: $CH_3OH + H_2O \rightarrow CO_2 + 6H^+ + 6e^-$       chemical formula 3

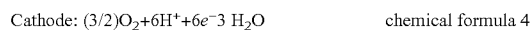

Cathode: $(3/2)O_2 + 6H^+ + 6e^- \rightarrow 3H_2O$       chemical formula 4

These equations mean that electrons, protons and carbon dioxide are formed by the catalyst in the anode catalyst layer. Carbon dioxide generated is exhausted in the atmosphere. The electrons are taken out of the fuel cell through an external circuit, and are used for power. generation. The protons move in a proton conductive electrolyte membrane, and arrive at the cathode. Water is formed in the cathode catalyst layer by a reaction of the electrons and oxygen and protons. The operating temperature of this direct methanol fuel cell is usually 50 to 120° C.

It was a drawback that a reformer should be provided in the fuel cell system and the entire system is forced to be large size, when a gas containing hydrogen is used as a fuel as in the solid polymer electrolyte fuel cell as described above, since the hydrogen gas is generally obtained by reforming methanol, natural gas or gasoline. The reforming process is generally performed at a high temperature of 250 to 300° C. In contrast, the system itself may be compact in the direct methanol fuel cell since no reformer is needed, and the power generation process can proceed at a relatively low temperature. Accordingly, the direct methanol fuel cell has been developed in recent years for applying it to a portable power source and an electric car power source by taking notice of this advantage of the direct methanol fuel cell.

An aqueous methanol solution or a vaporized mixture of methanol and water is supplied for feeding methanol and water to the fuel cell in the direct methanol fuel cell generator. Since a vaporizer should be provided as an auxiliary equipment of the fuel cell when methanol and water are supplied as an evaporated mixed gas, the total fuel cell system inevitably becomes large size. On the contrary, the system may be small size when the aqueous methanol solution is supplied, since no vaporizer is needed.

However, there are many difficult problems in the direct methanol fuel cell as described above as compared with solid polymer electrolyte fuel cells.

As an problem, the fuel supplied to the electrode moves within the electrode, enters a proton conductive electrolyte, moves within the electrolyte to arrive at the catalyst, and is used for generating electric power. The proton conductive electrolyte exhibits proton conductivity by being impregnated with water. It has been elucidated in the foregoing studies that introduction of methanol reduces proton conductivity (for example T. J. Chou and A. Tanioka, J. Phys. Chem., B102 (1998), 129). Methanol, water and oxygen as fuel components move by being dissolved into impregnated water in the proton conductive electrolyte in the catalyst layer. Reduced proton conductivity also reduces diffusion of water that moves by being pulled with the protons. Consequently, mobility of water and diffusion of methanol that is completely mixed with water are also decreased at the anode electrode. Methanol also exists at the cathode electrode since methanol supplied to the anode electrode arrives at the cathode electrode through the proton conductive electrolyte membrane. Accordingly, diffusion of water also decreases in the proton conductive electrolyte within the cathode catalyst layer. As a result, diffusion of oxygen is reduced since oxygen diffuses within the electrode by being dissolved in water in the proton conductive electrolyte. In summary, the fuel cell is confronted with a severe problem that diffusion abilities of all the fuel components of methanol, water and oxygen as fuels are reduced. Accordingly, it is inevitable for practical applications to elucidate characteristic values that can be readily measured in close relation with the degree of diffusion of the fuel.

As another problem, diffusion of the fuel is so poor immediately after resumption of operation that equipment is operated under a condition where response to variation of load is very poor, since-water impregnated in the proton conductive electrolyte is dried up during pause period of the operation of the direct methanol fuel cell generator. In case of generators, particularly generators for potable appliances and automobiles in which the fuel cell is intermittently operated in daily work and variation of load occurs frequently, the response to variation of load becomes very poor, thereby causing troubles in driving the appliances. Consequently, the trouble may induce severe accidents that may threaten human life. Therefore, it should be confirmed how is the response to variations of load, and how much is the performance of the fuel cell before and during power generation.

As a different problem, the perfluorocarbon sulfonic acid membrane is swelled by being impregnated with water, and swelling is much larger when the membrane is impregnated with methanol. Therefore, the proton conductive electrolyte membrane and catalyst layer are damaged by excessive swelling when a high concentration of aqueous methanol solution is supplied by some reasons, and the performance of the fuel cell is largely decreased.

Consequently, it has been recognized that development of a simple method for deciding the performance of the fuel cell during power generation is also important.

The fuel cell may be severely damaged by the condition of the proton conductive electrolyte membrane, or by the condition of fuel diffusion, in the direct methanol fuel cell generator as described above. Therefore, an inspection method for always verifying the condition of the fuel cell is important.

The characteristics of the fuel cell have been mostly evaluated by measuring an I-V curve. However, the measurements of the I-V curve also involves the results including other lines of information such as catalyst activity and internal resistance other than the degree of diffusion of the fuel. Furthermore, voltages should be measured in a wide range of current density for measuring the I-V curve. In particular, a stationary state operation should be naturally interrupted for measuring the I-V curve of the fuel cell that is under a long-run stationary operation. Since this inspection procedure costs much labor, it cannot be readily applied for evaluation and inspection.

SUMMARY OF THE INVENTION

Accordingly, it is an object of the present invention to provide a method for inspecting a direct methanol fuel cell generator that is able to readily obtain a line of information closely related to the degree of diffusion of the fuel during power generation of the fuel cell, and to exactly decide the performance of the fuel cell.

It is another object of the invention to provide a simple and highly accurate inspection apparatus for realizing the inspection method, and a direct methanol fuel cell generator comprising the inspection apparatus.

According to a first aspect of the present invention, there is provided An inspection method for a direct liquid fuel cell generator having a plurality of cells, each comprising an anode electrode including an anode catalyst layer, a cathode electrode including a cathode catalyst layer, and an electrolyte disposed between the anode electrode and the cathode electrode, for power generation by supplying a liquid fuel to the anode electrode and an oxidant gas to the cathode electrode, wherein validity of the fuel cell is decided based on an observation result of time dependent changes of the voltage V of one electromotive unit which is caused by generating a current density change $\Delta I$ or $-\Delta I$ ($\Delta I$ in $mA/cm^2$ unit represents a positive value) satisfying the condition of $0.2 \leq \Delta I \leq 10$ in a current density I ($mA/cm^2$), which is taken out from an arbitrary number of cells connected in series constituting the direct liquid fuel cell generator under power generation, during a time interval $\Delta t$ (sec) satisfying the condition of $10^{-5} \leq \Delta t \leq 0.5$.

According to a second aspect of the present invention, there is provided An inspection apparatus for a direct liquid fuel cell generator having a plurality of cells, each comprising an anode electrode including an anode catalysis layer, a cathode electrode including a cathode catalyst layer, and an electrolyte disposed between the anode electrode and the cathode electrode, for power generation by supplying a liquid fuel to the anode electrode and an oxidant gas to the cathode electrode, the apparatus comprising: a load connected to an output from the direct liquid fuel cell generator to consume output power thereof; means connected to the output from the direct liquid fuel cell generator, for changing an output current density by controlling the load; means for measuring an output voltage from the direct liquid fuel cell generator; and a decision device connected to the current density control means and voltage detection means, for discriminating the condition of the fuel cell generator from the initiation time of the current density change, and from the measured results of the change of the output voltage.

According to a third aspect of the present invention, there is provided a direct liquid fuel cell generator having a plurality of cells, each comprising an anode electrode including an anode catalysis layer, a cathode electrode including a cathode catalyst layer, and an electrolyte disposed between the anode electrode and the cathode electrode, for power generation by supplying a liquid fuel to the anode electrode and an oxidant gas to the cathode electrode, the liquid fuel cell generator comprising: a load connected to an output from the direct liquid fuel cell generator to consume output power thereof; means connected to the output from the direct liquid fuel cell generator, for changing an output current density by controlling the load; means for measuring an output voltage from the direct liquid fuel cell generator; and a decision device connected to the current density control means and voltage detection means, for discriminating the condition of the fuel cell generator from the initiation time of the current density change, and from the measured results of the change of the output voltage.

BRIEF DESCRIPTION OF THE DRAWINGS

FIG. 2A is a graph showing a time dependent change of the voltage observed by increasing-the loaded electric current at a time of T=0; and FIG. 2B is a graph showing a time dependent change of the voltage observed by decreasing the loaded electric current at a time of T=0;

DESCRIPTION OF THE PREFERRED EMBODIMENTS

The invention will be described in detail with reference to the embodiments.

[Fuel Cell]

Figure 1:
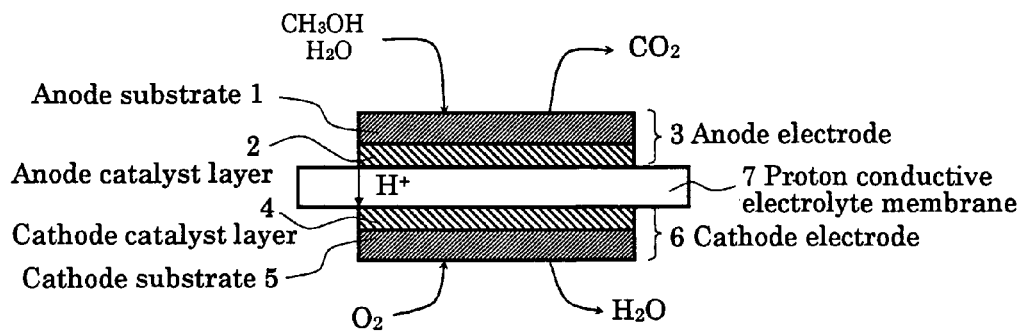
FIG. 1 is a schematic cross section showing the structure of a cell as a power generation element of a direct methanol fuel cell.

An example of a fuel cell suitable for applying the invention is shown in FIG. 1. The cell comprises an anode substrate 1, an anode electrode 3 including an anode catalyst layer 2, a cathode catalyst layer 4, a cathode electrode 6 including a cathode substrate 5, and a proton conductive electrolyte membrane 7 disposed between the anode electrode 3 and the cathode electrode 6. A direct methanol fuel cell comprises a plurality of cells, which is shown in FIG. 1. Terminals (not shown) are connected to the respective electrodes, and devices for supplying a liquid fuel and an oxidant gas to the anode electrode and cathode electrode, respectively, are provided in the fuel cell. An inspection apparatus and external load to be described below are connected to respective terminals.

While the fuel cell suitable for applying the invention comprises the plural cells, a fuel feed portion including a fuel tank for supplying a liquid fuel to the cells, an oxidant feed portion, and power terminals of the fuel cell generator, a cell having another structure and material except those shown in FIG. 1 may be employed in the fuel cell.

Examples of the liquid fuel used for the fuel cell of the invention include aqueous solutions of organic compounds such as methanol, ethanol, formic acid, formaldehyde and dimethyl ether. Among these compounds, methanol, formic acid, formaldehyde and dimethyl ether are preferable due to their high reactivity, and methanol is most preferable since it is efficiently allowed to react by a platinum-ruthenium catalyst.

[Inspection Method]

Figure 2A:
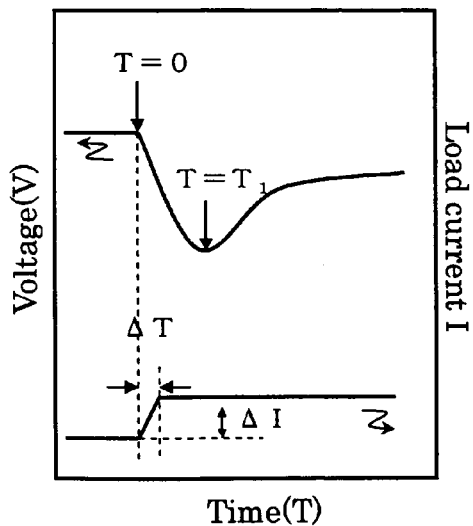
FIGS. 2A and 2B are graphs for describing the principle of the inspection method of the invention, where
Figure 2B:
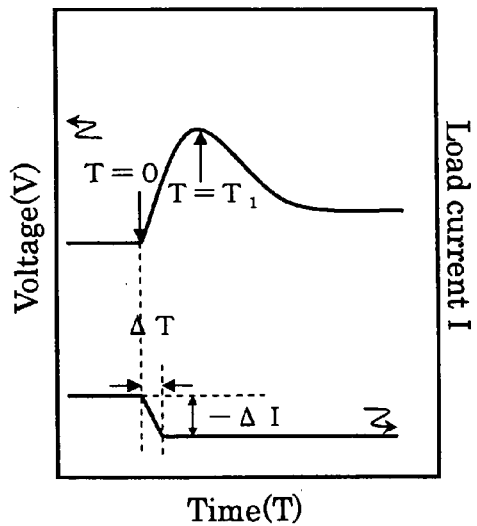

FIGS. 2A and 2B are graphs for describing the principle of the inspection method of the invention. FIG. 2A is a graph showing changes of the voltage V dependent on the time T caused by a change ΔI of in the current density flowing through a load connected to the fuel cell. The voltage rapidly decreases immediately after the change ΔI of the current density flowing in the load. This current change becomes gentle in accordance with the lapse of time, and the voltage becomes minimum at T=T1. The voltage monotonously increases at T>T1, and settles at a constant level in accordance with the further lapse of time.

This phenomenon is conjectured to arise by the following reasons. Since the current density has increased at T=0, the surface of the catalyst and the neighboring area thereof becomes locally deficient in the fuel. Consequently, the voltage decreases with the lapse of time due to diffusion polarization. On the other hand, the fuel that has been deficient is supplied to the catalyst and the neighboring area thereof to ameliorate deficiency of the fuel. Accordingly, the voltage turns to increase with the lapse of time at T=T1 and thereafter, and settles at a constant level.

FIG. 2B is a graph showing a change −ΔI of the current density flowing through the load connected to the fuel cell, or the time dependent change of the voltage V caused by the decreased current density. The voltage rapidly increases immediately after a current density change −ΔI. Then, the voltage change becomes gentles with the lapse of time, and the voltage becomes maximum at T=T1. The voltage monotonously decreases at T>T1, and settles to a constant level with the further lapse of time.

This phenomenon is conjectured to arise by the following reasons. Since the current density has decreased at T=0, the fuel becomes excess on the surface of the catalyst in the electrode and at the neighboring area thereof as compared before. Consequently, diffusion polarization reduces to increase the voltage with the lapse of time. On the other hand, the excess fuel moves to the catalyst and the neighboring area thereof to ameliorate local excess of the fuel. Accordingly, the voltage decreases with the lapse of tine at T=.T1 and thereafter, and settles to a constant level.

Since the change of the electromotive force accompanied by the change of the current density shown in FIGS. 2A and 2B represents the degree of diffusion of the fuel as will be apparent from the descriptions above, the fuel cell may be readily inspected based on the principle above. Diffusion of the fuel is shown to be quite poor when the time T1 that shows the time when the voltage generated by the current change shows a minimum or maximum is larger than a prescribed time. This phenomenon indicates that the electromotive force of the fuel cell cannot follow the change of load during the operation of the cell. The fact that the time showing the maximum or minimum voltage is out of a prescribed range when the voltage change caused by the current density is measured clearly indicate that the performance of the fuel cell is poor. Therefore, the fuel cell can be simply and objectively inspected based on a criterion that T1 is within a prescribed time.

When $\Delta t$ that is a time for allowing the current density to change is too long, the behaviors shown in FIGS. 2A and 2B become so dull that a precise inspection becomes unable in the invention. On the other hand, making $\Delta t$ too short is not practically preferable, since the structure of the inspection apparatus becomes complex and the apparatus becomes expansive. A range of the time $\Delta t$ for allowing the current density to change of $10^{-5} \leq \Delta t \leq 0.5$ is preferable, because the changes as shown in FIGS. 2A and 2B becomes evident to an extent enough for achieving sufficient inspection provided by the invention, and because the inspection apparatus is cheaply manufactured. A range of $10^{-5} \leq \Delta t \leq 2 \times 10^{-3}$ is more preferable, since the change, is more evidently observed.

The inspection becomes difficult due to a too small voltage change generated when $\Delta I$ that is the current density change is too small. On the other hand, too large $\Delta I$ is also not practically preferable, since the fuel is wasted for unnecessary power generation of the fuel cell generator, or the power generation state is excessively disturbed. Therefore, the practically available range is $0.2 \leq \Delta I \leq 10$, more preferably $0.2 \leq \Delta I \leq 5$. A range of $0.2 \leq \Delta I \leq 2$ is particularly preferable, because disturbance of the fuel cell generator under power generation is very small.

While the current density change is linear in FIGS. 2A and 2B, the current density change may be different patterns. For example, the change may be a curve or a gradation such as two steps or more of changes. Alternatively, the change may be not necessarily a monotonous increase or decrease.

Figure 3:
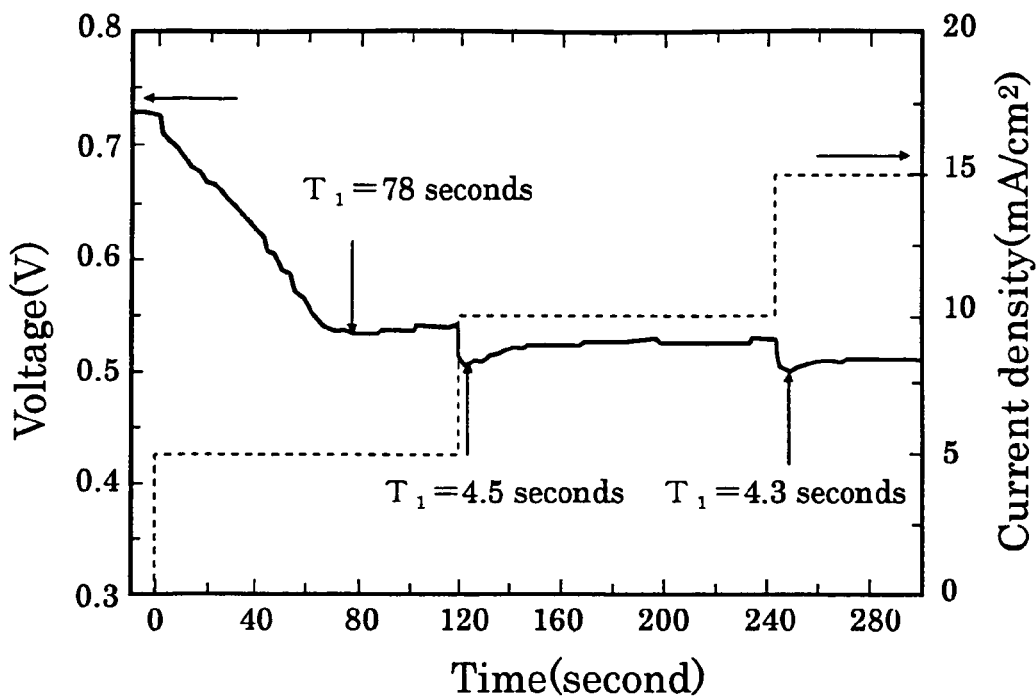
FIG. 3 is a graph showing a time dependent change of the voltage of the voltage corresponding to the change of the current density in an example of the invention when the load current is increased from 0 $mA/cm^2$ to 5 $mA/cm^2$, from 5 $mA/cm^2$ to 10 $mA/cm^2$, and from 10 $mA/cm^2$ to 15 $mA/cm^2$.

The inspection method of the invention should be performed in the process when the current density I generated by the fuel cell generator is a non-zero finite value. As an example, FIG. 3 is a graph showing time dependent changes of the voltage corresponding to the change of the current density when the current densities flowing in the load connected to the fuel cell are increased from 0 mA/cm² to 5 mA/cm², from 5 mA/cm² to 10 mA/cm², and from 10 mA/cm² to 15 mA/cm², respectively. The time T1 that shows the minimum level of the output voltage of the fuel cell caused by the current density change is in the range of 4 to 5 seconds, when the current density is increased from 5 mA/cm² to 10 mA/cm², and from 10 mA/cm² to 15 mA/cm². T1 is prolonged to a far longer time of 78 seconds when the current density is increased from 0 mA/cm² to 5 mA/cm².

It was revealed from repeated experiments by the inventors that a far more longer voltage maximum or minimum time T1 is observed when a condition that gives a current density of 0 mA/cm² has appeared at least once or more in the process of change of the current density, as compared with the case where no such condition that gives a current density of zero has not been experienced in the process. The inspection method provided by the invention cannot be used when the minimum or maximum time of the voltage change is long, since the inspection efficiency is decreased to compromise reliability to the inspection results.

In the method that has been conventionally used for inspection and evaluation of the fuel cell generator, the current density generated by connecting the fuel cell to the load is changed to zero for a quite short period of time (usually several microseconds), and a current having the same magnitude as that immediately before reducing the current to zero is again loaded thereafter. The fuel cell is inspected and evaluated by the voltage change observed between before and after reducing the current density to zero (a current shut-down method). This method is naturally quite different from the method provided by the invention, because the process of change of the current density once experiences zero current in the conventional method, and a highly reliable inspection is impossible due to disturbance of the inspection results as described above.

Since the length of the time T1 when the voltage as a criterion of validity of the fuel cell is minimum or maximum changes depending on the characteristics required for the fuel cell inspected, the structure of the electrolyte catalyst layer and electrolyte membrane, the compositions of the catalyst and electrolyte membrane, the electrode area, the flow rate of the fuel, the structure of the flow passageway plate of the fuel, the operation temperature, and I and $\Delta I$, it may be appropriately determined by taking these conditions into consideration. However, it is quite preferable that the setting time of T1 is shorter than 15 seconds according to the experiments by the inventors. Since the performance of the fuel cell is markedly decreased when T1 exceeds 15 seconds, it is difficult to practically use such fuel cell.

[Inspection Apparatus: First Inspection Apparatus]

Figure 8:
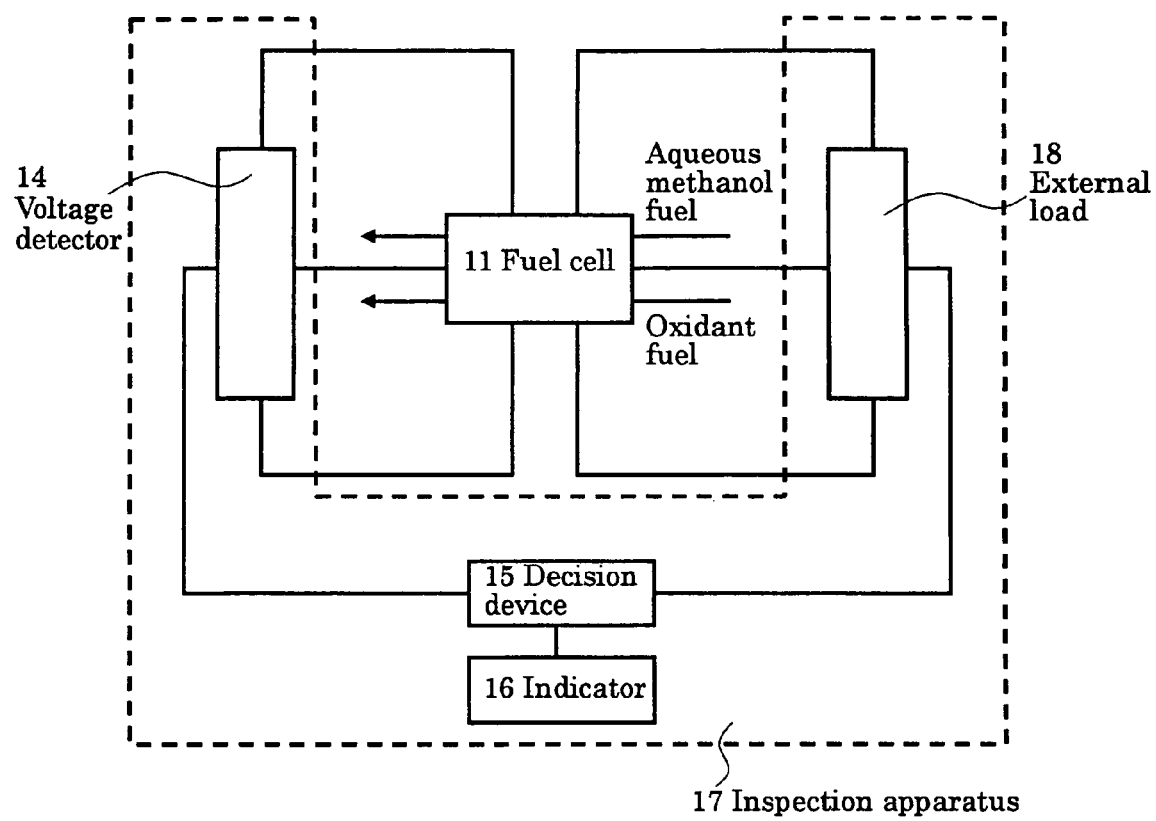
FIG. 8 is a schematic diagram showing an example of the inspection apparatus for the direct methanol fuel cell generator of the invention.

The inspection apparatus 17 shown in FIG. 8 comprises an external load 18 connected to the output from the fuel cell 11, a voltage detector 14 that measures the output voltage of the fuel cell 11, a decision device 15 for deciding by importing the voltage change measured by the voltage detector 14, and an indicator 16 for indicating the decision results of the decision device 15.

The external load 18 is provided for consuming the output power of the fuel cell in the inspection apparatus 17 while controlling the amount of load based on the control signal from the decision device 15. A commercially available electronic load apparatus (for example a combination of EML-150L load module and EML-30B frame made by Fujitsu Access Ltd.) may be actually used as the load.

The voltage detector 14 is provided for converting the voltage of the power exported from the fuel cell 11 into a form capable of signal processing, and an apparatus for exporting the applied voltage into digital signals by an analogue-digital converter.

The decision device 15 is provided for changing the current density of the output power from the fuel cell 11 with a given time period and given magnitude, thereby changing the output voltage of the fuel cell 11 while permitting real time input of the output voltage level from the voltage detector 14. Validity of the performance of the fuel cell as an object of the inspection is decided based on the change above. This device may be realized using a one-chip computer, general use microcomputer or logic circuitry.

The indicator 16 is provided for indicating the results from the decision device 15 or informing them by means of light, sound or vibration, and examples of the device include a display such as CRT and liquid crystal, a lamp such as LED, and a speaker.

Figure 18:
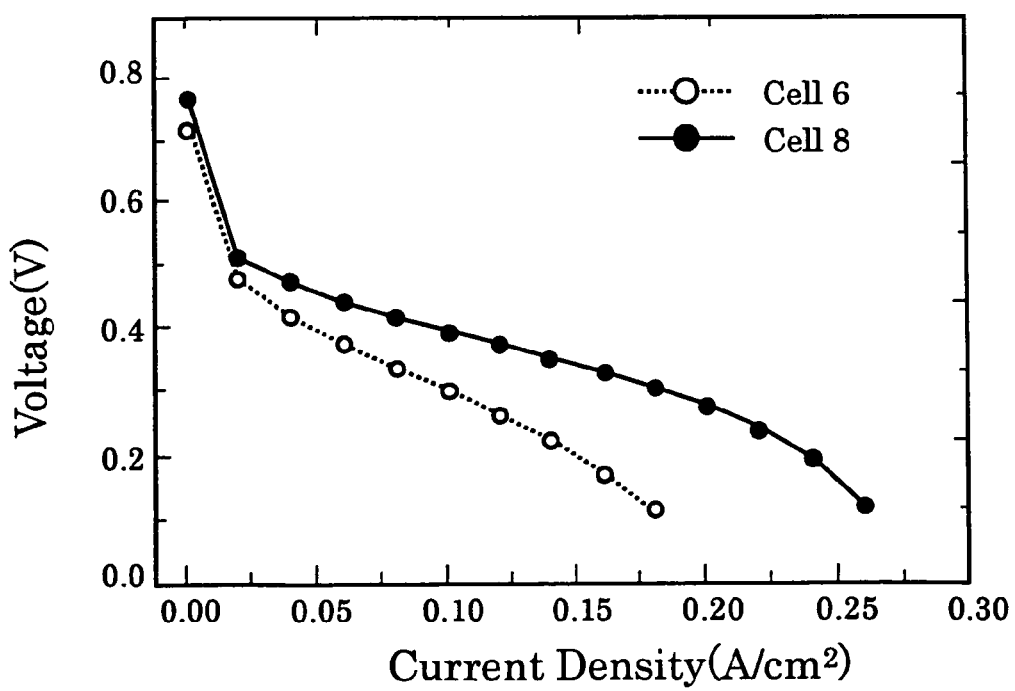
FIG. 18 is a graph showing the I-V curves in another example of the invention.

While the fuel cell as shown in FIG. 18 exports the electric power through four terminals, the output terminals may be composed of two terminals comprising a terminal at the positive electrode and a terminal at the negative electrode. When the external load connected to the fuel cell has a large capacity for the electric current, voltage drop of the electric power applied to the voltage detector becomes so large when the fuel cell comprises two terminals that the sensed results are affected by the voltage drop. Accordingly, four terminals are preferably used in this case.

The inspection procedure using the inspection apparatus as described above is described below with reference to FIG. 9 as a flow chart of the procedure.

Figure 9:
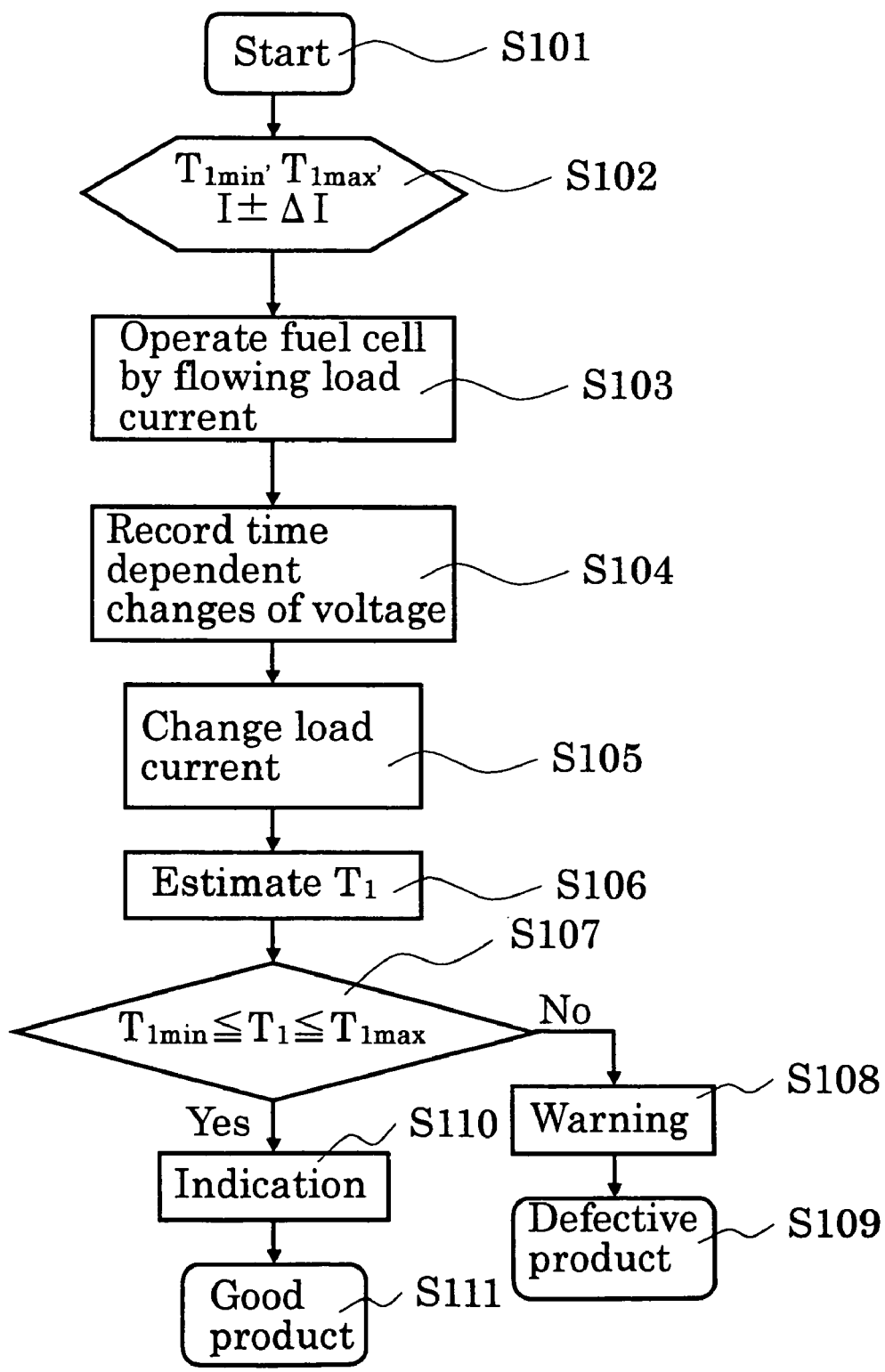
FIG. 9 is a flow chart showing the inspection procedure using the inspection apparatus for the direct methanol fuel cell generator of the invention.

In FIG. 9, the minimum time $T1_{min}$ indicating the minimum or maximum voltage as a criterion of validity of the fuel cell as the object of inspection, the maximum time $T1_{max}$ indicating the minimum or maximum of the voltage, and the current density I and the change of the current density ±Δ1 are set (S102) after the start of the inspection (S101). $T1_{min}$ and $T1_{max}$ determine the minimum allowable time and maximum allowable time.

The fuel cell is started to operate (S103), and a load current is allowed to flow after connecting the load 8 to the fuel cell, and time dependent changes of the voltage applied on the load are recorded (S104). The load current is changed in this state (S105) while applying the voltage to the load, and T1 as the time when the voltage indicates the minimum or maximum level is determined (S106). T1 is decided whether it is within a prescribed time interval or not (S107), and the indicator issues a warning that the fuel cell is defective when T1 is out of the prescribed time interval (S108) to allow the inspection to come to its end (S109). The indicator indicates that the fuel cell is successful (S110) when no defects are found, and the inspection is completed (S111). Two or more setting ranges of T1 may be provided in order to classify the inspected fuel cell generator in more detail to more precisely discriminate the condition of the fuel cell.

[Inspection Apparatus: Second Inspection Apparatus]

Figure 15:
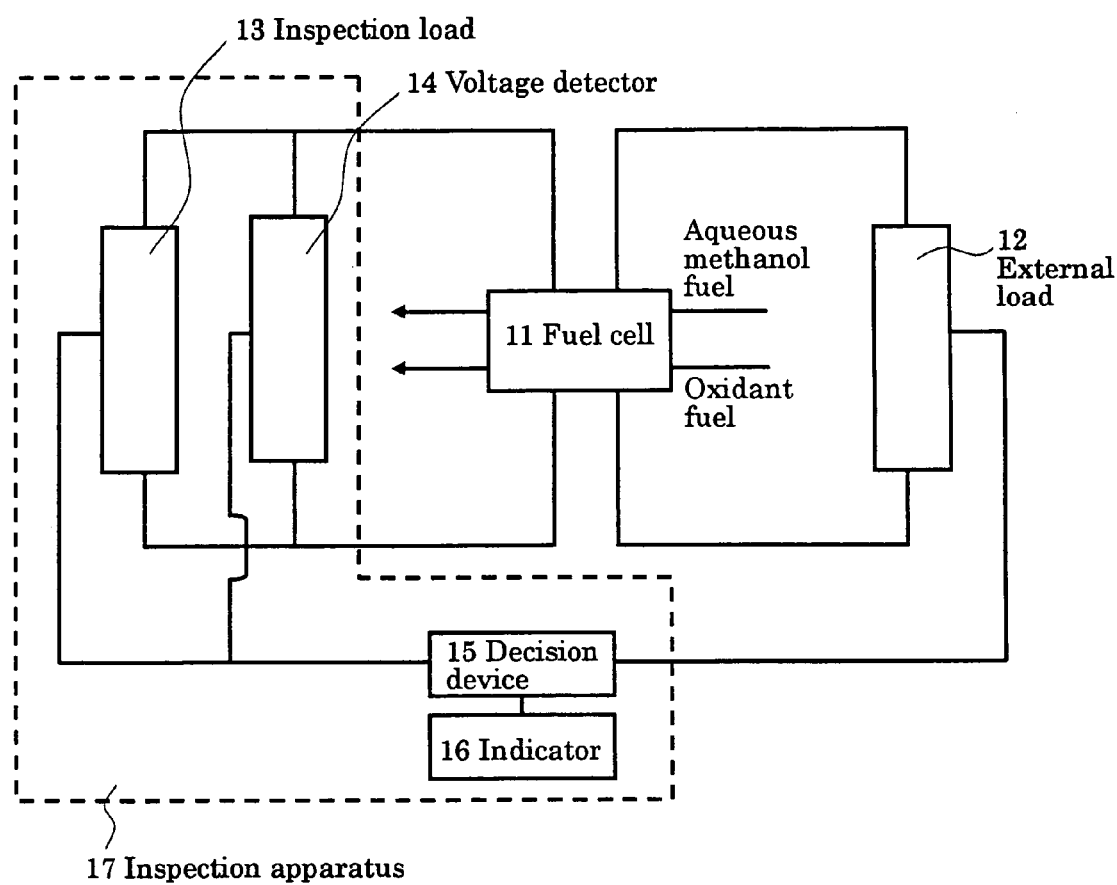
FIG. 15 is a schematic diagram showing another example of the inspection apparatus for the direct methanol fuel cell generator of the invention.

Another example of the inspection apparatus of the invention is shown in FIG. 15. The same reference numerals are given to the same members in FIG. 15 as those in FIG. 8. Different from the apparatus in FIG. 8, the power output from the fuel cell 11 is dispensed into the external load 12 consuming the output and the inspection load 13 for inspection of the invention. The decision device 15 measures the load generated by the external load 12 and inspection load 13 while changing the load on the fuel cell by controlling the inspection load 13 in order to observe the change of the output voltage. The inspection apparatus in this embodiment is possible to discriminate the load of the fuel cell and the load for inspection, thereby making it possible to construct a fuel cell generator that can be most commonly used.

As is evident from FIG. 15, an aqueous methanol solution and an oxidant fuel are supplied to the fuel cell 11, and the fuel cell is operated such that the load current flows through the load 12 connected to the output power of the fuel cell 11. The inspection device 17 in the embodiment comprises the inspection load 13, voltage detector 14, decision device 15 and indicator 16. The inspection load 13 is used in order to change the load level that changes the load current flowing from the fuel cell.

While the output pour is also taken out through four terminals in the fuel cell in FIG. 15, two terminals may be used for this purpose as same in FIG. 8 described above.

Figure 16:
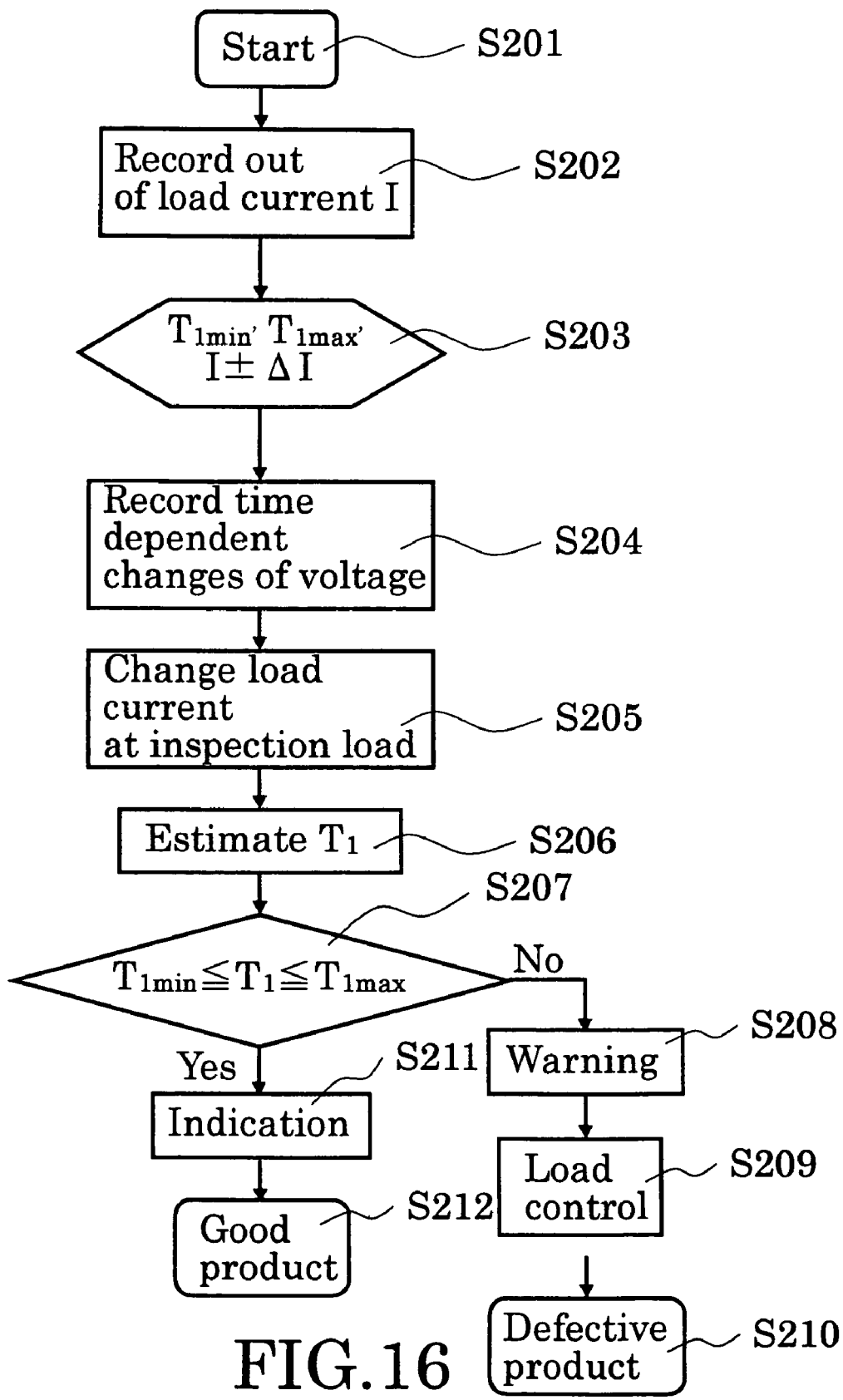
FIG. 16 is a flow chart showing the inspection procedure using the inspection apparatus for the direct methanol fuel cell generator of the invention.

The inspection procedure using the inspection apparatus will be described below with reference to FIG. 16 as a flow chart thereof. After the start (201) of inspection, the load current density I is read out (S202) as shown in FIG. 16. Then, T1min, T1max and ±ΔI are set based on the current density I (S203). However, these values may be set without reading out the current density I. Subsequently, the voltage is detected using the voltage detector 14 to record the time dependent changes (S204). Then, changes of ±ΔI are given to the load current density using the inspection load (S205), T1 is determined (S206), and T1 is determined whether it is within a prescribed range or not (S207). A warning is issued using an indicator when T1 is out of the prescribed range (S208), the load is controlled for security or the like (S209), and the inspection comes to its end by deciding that the fuel cell is defective (S210). Control of the load may be omitted, if it is desirable. Alternatively, when T1 is within the prescribed range (S211), the inspection comes to its end (S212) based on the decision that the fuel cell is successful without any problems. Two or more setting ranges of T1 may be provided in order to classify the inspected fuel cell generator in more detail for controlling the load.

[Fuel Cell Generator]

The inspection apparatus is connected to the direct methanol fuel cell in the fuel cell generator of the invention, and the fuel cell is further connected to an external load.

The fuel cell generator of the invention may be housed in a housing as one power generator, or the fuel cell generator may be divided into a plurality of members that are electrically or mechanically connected with each other as a power generator system. It is preferable to integrate the housing as a power generator in order to use it as a power source of portable electronic appliances. The power source for driving the generator may be supplied from the fuel cell itself. However, since various control devices should be operated for indicating the condition of the fuel cell even when the fuel cell is at rest, another cell is preferably mounted.

The inspection method and procedure of the fuel cell generator are preferably executed according to a program written in a nonvolatile memory integrated into the decision device constituting the inspection apparatus.

EXAMPLE

While the invention is described in more detail based on the examples, the invention is not restricted to these examples.

Example 1

Assembling of the Direct Methanol Fuel Cell

The following is the method for manufacturing the cell of the fuel cell generator used in the example of the invention. Carbon black for supporting the anode catalyst (Pt:Ru=1:1) and carbon black for supporting the cathode catalyst (Pt) were produced by a method known in the art (R. Ramakumar et. al., J. Power Sources 69 (1997), 75). The amounts of the supported catalysts were 30 and 15 parts by weight on the anode and cathode, respectively, relative to 100 parts by weight of carbon.

For preparing the anode electrode, a perfluorocarbon sulfonic acid solution (Nafion solution SE-20092 made by DuPont Co.) and ion exchange water were added to carbon black for supporting the anode catalyst prepared in the foregoing process, and a paste was prepared by dispersing carbon black for supporting the anode catalyst. This paste was applied on a sheet of carbon paper TGPG-120 (made by E-TEK Co.) after water repelling treatment followed by drying.

For preparing the cathode electrode, a perfluorocarbon sulfonic acid solution (Nafion solution SE-20092 made by DuPont Co.) and ion exchange water were added to carbon black for supporting the cathode catalyst prepared in the foregoing process, and a paste was prepared by dispersing carbon black for supporing the cathode catalyst. This paste was applied on a sheet of carbon paper TGPG-090 (made by E-TEK Co.) after water repelling treatment followed by drying.

The cell shown in FIG. 1 was prepared by bonding the anode electrode and cathode electrode prepared in the foregoing process on both faces, respectively, of a commercially available perfluorocarbon sulfonic acid membrane by hot-press (125° C., 5 minutes).

Example 2

Determination of Inspection Condition

The fuel cell was assembled by connecting five cells prepared as described above in series, followed by connecting an aqueous methanol feed device and a oxidant feed device.

The fuel cell was operated while changing the current density by changing the time $\Delta T$ as a time required for changing the current density. In this experiment, the current density I was set at 145 mA/cm$^2$ and the current density difference $\Delta I$ was set at 5 mA/cm$^2$ to change the current density from 145 mA/cm$^2$ to 150 mA/cm$^2$. An aqueous methanol solution with a concentration of 2M was sent to the anode electrode using a commercially available feed pump. Air was sent to the cathode side using a commercially available air pump. The flow rate of air was controlled using a commercially available mass flow controller. The commercially available electronic load apparatus described above was used as the load for exporting the power of the fuel cell. A commercially available digital multimeter was used for sensing the voltage. The direct methanol fuel cell with an electrode area of 10 cm$^2$ was operated by controlling the operation temperature of the fuel cell at 70° C.

Figure 4:
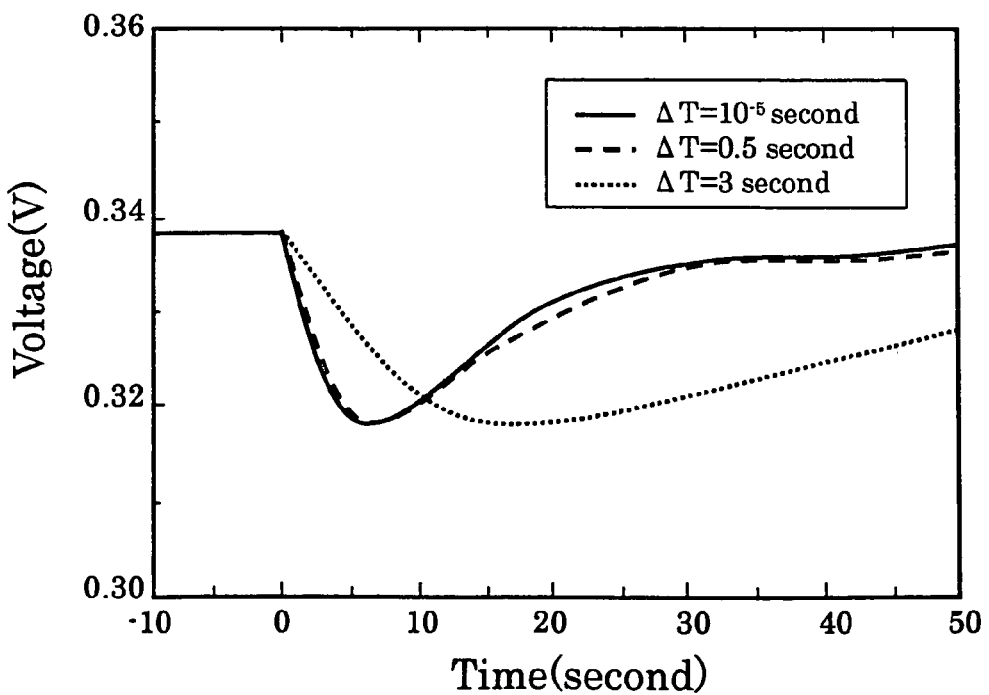
FIG. 4 is a graph showing the voltage response by changing the time when the current density is changed, wherein the graph shows a time dependent changes of the voltage by changing the load current when the lapse of time ΔT is changed to $10^{-5}$, 0.5, and 3 seconds, respectively.

The results of power generation test under the operation condition above are shown in FIG. 4. In FIG. 4, time dependence of the voltage due to the current change is shown.

In FIG. 4, the solid line, broken line and dotted line denote the changes of the current density at $\Delta T$ of $10^{-5}$, 0.5 and 3 seconds, respectively. The result at $\Delta T$ of 3 seconds is evidently different from the results at $\Delta T$ of $10^{-5}$ and 0.5 seconds, and voltage drop and voltage raise thereafter are quite gentle. T1 was 5.3 seconds at $\Delta T$ of $10^{-5}$ second, 5.5 seconds at $\Delta T$ of 0.5 second, and 17 seconds at $\Delta T$ of 3 seconds.

Figure 5:
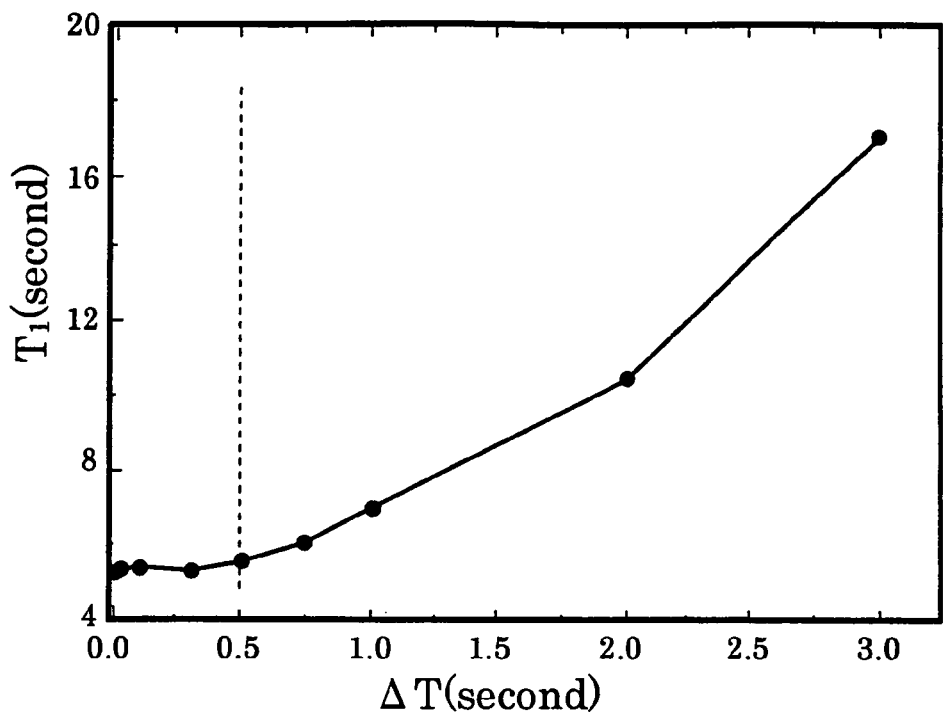
FIG. 5 is a graph showing the ΔT dependency of T1 in an example of the invention.

FIG. 5 shows $\Delta T$ dependency of T1. While T1 is almost constant in the range of $\Delta T$ of 0.5 second or less, T1 is monotonously increased with the increase of $\Delta T$ when it is larger than 0.5 second. These results show that the voltage change provided in the invention becomes dull when $\Delta T$ is larger than 0.5 second, and the method of the invention cannot be used for inspection. Accordingly, it was found that the preferable upper limit of $\Delta T$ is 0.5 second.

Example 3

Determination of Inspection Condition

The magnitude of the change of the current density $\Delta I$ was changed using the same fuel cell as in Example 2, and the time T1 before attaining the minimum or maximum voltage change was investigated.

The current density I was set at 170 mA/cm$^2$, and a change of $-\Delta I$ was given to the current density. An aqueous methanol solution with a concentration of 2M was sent to the anode electrode using a commercially available feed pump. Air was sent to the cathode side using a commercially available air pump. The flow rate of air was controlled using a commercially available mass flow controller. The commercially available electronic load apparatus described above was used as the load for exporting the power of the fuel cell. A commercially available digital multimeter was used for sensing the voltage. The direct methanol fuel cell with an electrode area of 25 cm$^2$ was operated by controlling the operation temperature of the fuel cell at 80° C.

Figure 6:
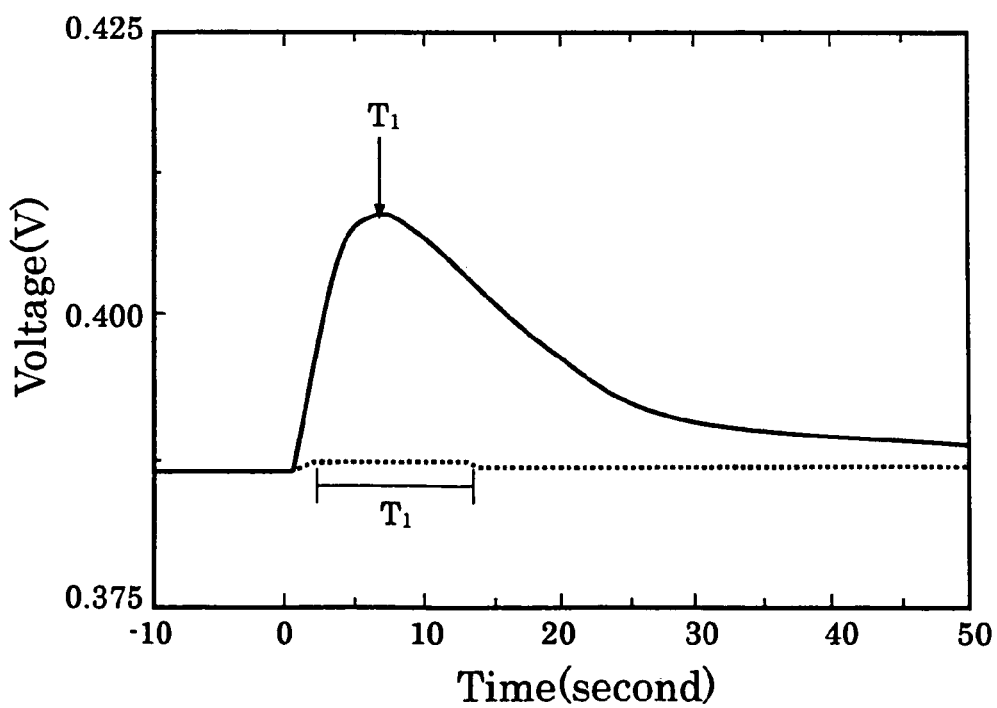
FIG. 6 is a graph showing a time dependent change of the voltage observed by changing the magnitude of ΔI in an example of the invention.

The results are shown in FIG. 6. In figure, solid line indicates a case where $\Delta I$ is set to 2, and broken line indicates a case where $\Delta I$ is set to 0.1. When $\Delta I$ is 2, the maximum value of voltage is clear, so that T1 was determined to be 6.5 seconds. On the other hand, when $\Delta I$ is 0.1, change in voltage is extremely small, so that the maximum value was not discriminated, and it was not possible to clearly determine T1 unlike when change $\Delta I$ in current density is 2.

Figure 7:
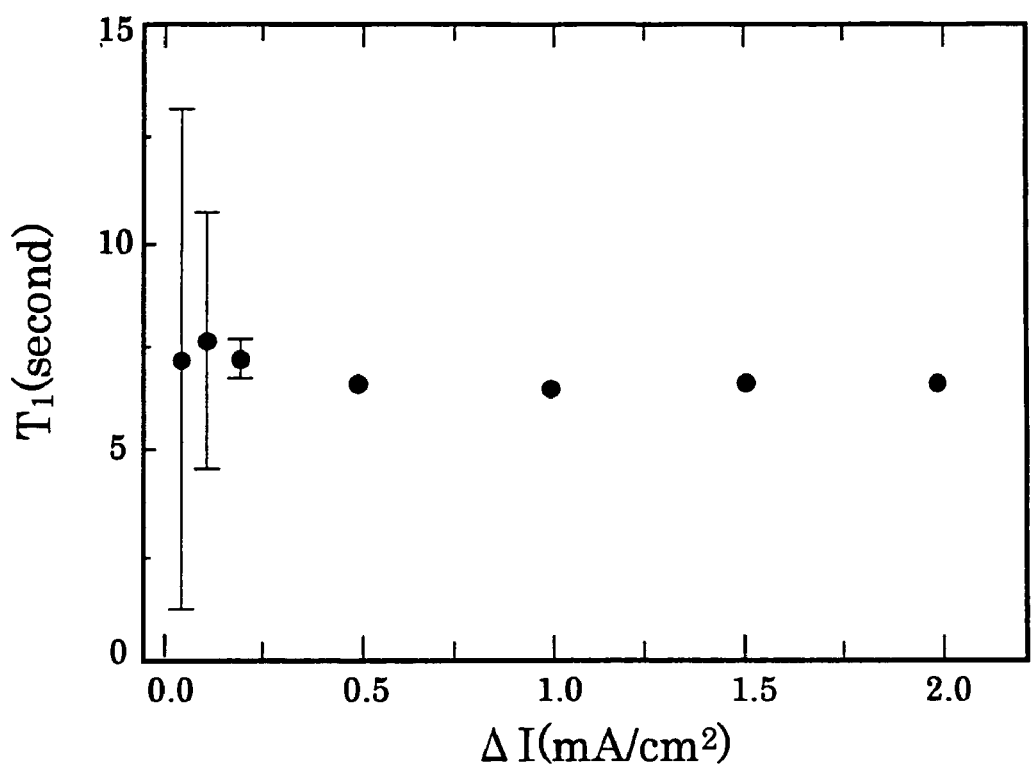
FIG. 7 shows ΔI dependency of T1.

FIG. 7 shows $\Delta I$ dependency of T1. It was found that precise decision of T1 is difficult when $\Delta I$ is less than 0.2 due to large error bars. Accordingly, the preferable lower limit of $\Delta I$ was found to be 0.2.

Example 4

Inspection Apparatus 1

The example of inspection using the fuel cell generator shown in FIG. 8 will be described below.

A program operating as a decision device and indication device was created using a commercially available programming language operated on a PC, and was used as the decision device and indication device.

The following three kinds of cells were prepared by different preparation conditions, and the cells were inspected using the inspection apparatus of the invention.

Cell 1: the fuel cell described in Example 2 was assembled using the cell prepared in example 1.

Cell 2: the cell prepared in Example 1 was immersed in a 4M aqueous methanol solution for 30 hours, and the fuel cell described in Example 2 was assembled.

Cell 3: the cell prepared in Example 1 was immersed in a 7M aqueous methanol solution for 30 hours, and the fuel cell described in Example 2 was assembled.

A 2M aqueous methanol solution was sent to the anode side at a flow rate of 0.6 ml/minutes with a commercially available feed pump using the cells 1 to 3. Air was sent at a flow rate of 60 ml/minute to the cathode side using a commercially available air pump. The flow rate of air was controlled using a commercially available mass flow controller. A commercially available electronic load apparatus was used as the load. A commercially available multimeter was used for the voltage detector. GPIB interface was attached to PC, and the load and inspection load, and voltage detector were connected to the interface using commercially available GPIB cable.

I and $\Delta I$ were set at 30 mA/cm$^2$ and 5 mA/cm$^2$, respectively, using the inspection apparatus, and the current density was changed from 30 mA/cm$^2$ to 35 mA/cm$^2$. At was set at $10^{-4}$. It was confirmed that the load was changed within $10^{-4}$ second as confirmed with a commercially available ammeter. $T1_{min}$ was set at 1 second, and $T1_{max}$ was set at 5 seconds.

A commercially available buzzer as an indicator was adjusted so that it sounds when T1 is out of the prescribed range. Other indicators available include a buzzer or ring, a LED or lamp, a vibrator, or a smelling device, or a combination thereof. The indicator is not always required.

Figure 10:
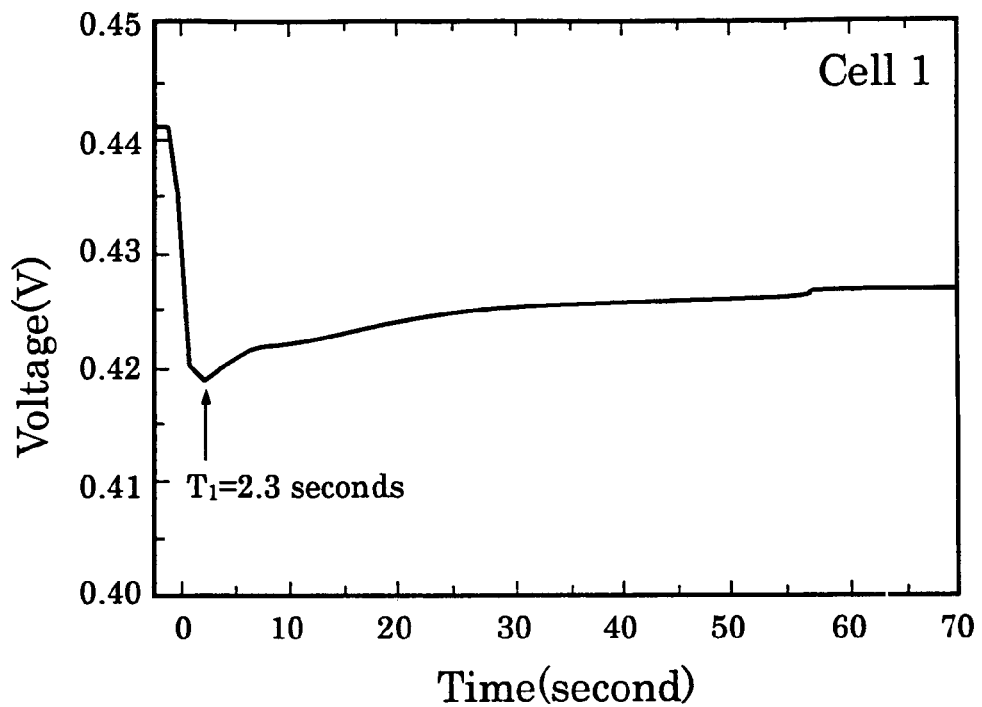
FIG. 10 is a graph showing a time dependent change of the voltage of a fuel cell 1 before and after changing the load current.

FIG. 10 shows the time dependent change of the voltage of the cell 1 before and after the change of load current. This cell had the smallest T1 of 2.3 seconds among the three cells. The cell 1 was decided to be good from this result.

Figure 11:
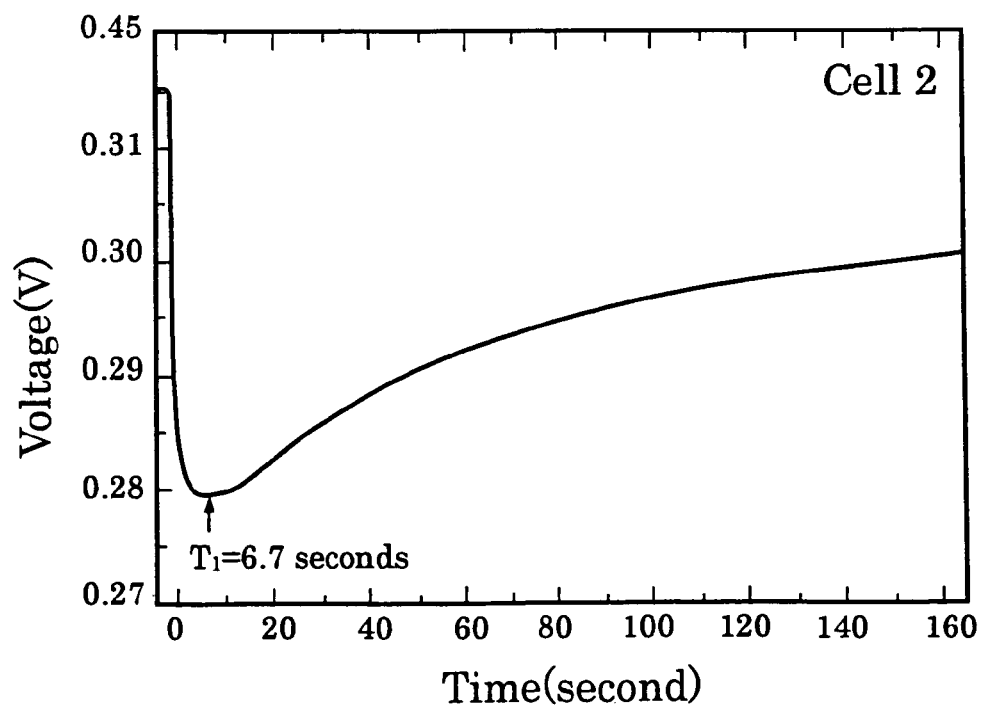
FIG. 11 is a graph showing a time dependent change of the voltage of a fuel cell 2 before and after changing the load current.

FIG. 11 shows the time dependent change of the voltage of the cell 2 before and after the change of load current. T1 of this cell was 2.3 seconds. The cell 2 was decided to be defective from this result.

Figure 12:
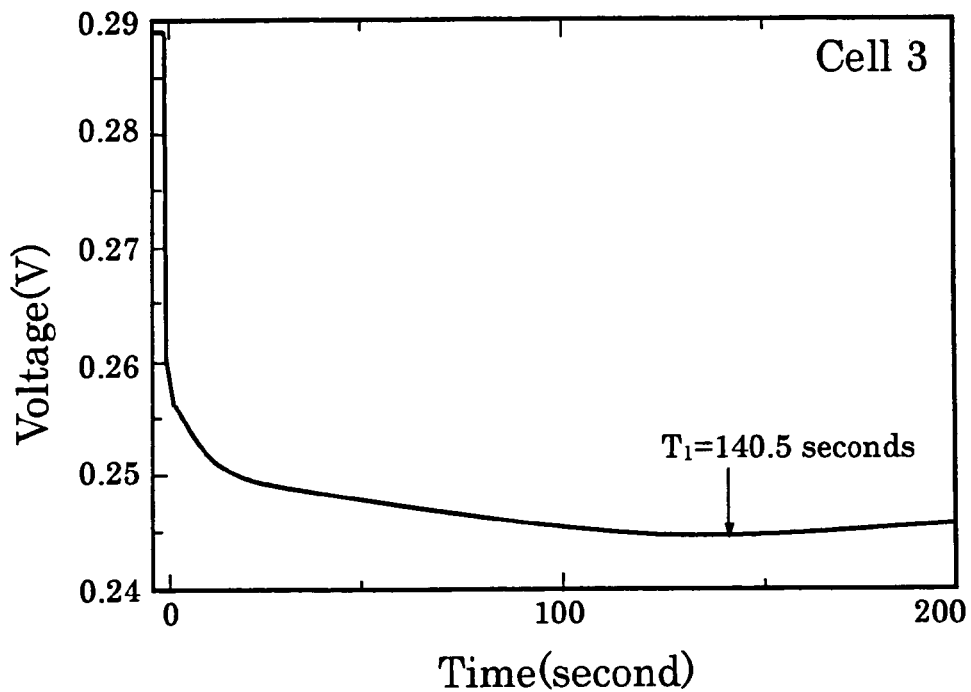
FIG. 12 is a graph showing a time dependent change of the voltage of a fuel cell 3 before and after changing the load current.

FIG. 12 shows the time dependent change of the voltage of the cell 3 before and after the change of load current. T1 of this cell was 149.5 seconds. The cell 3 was decided to be defective from this result.

Figure 13:
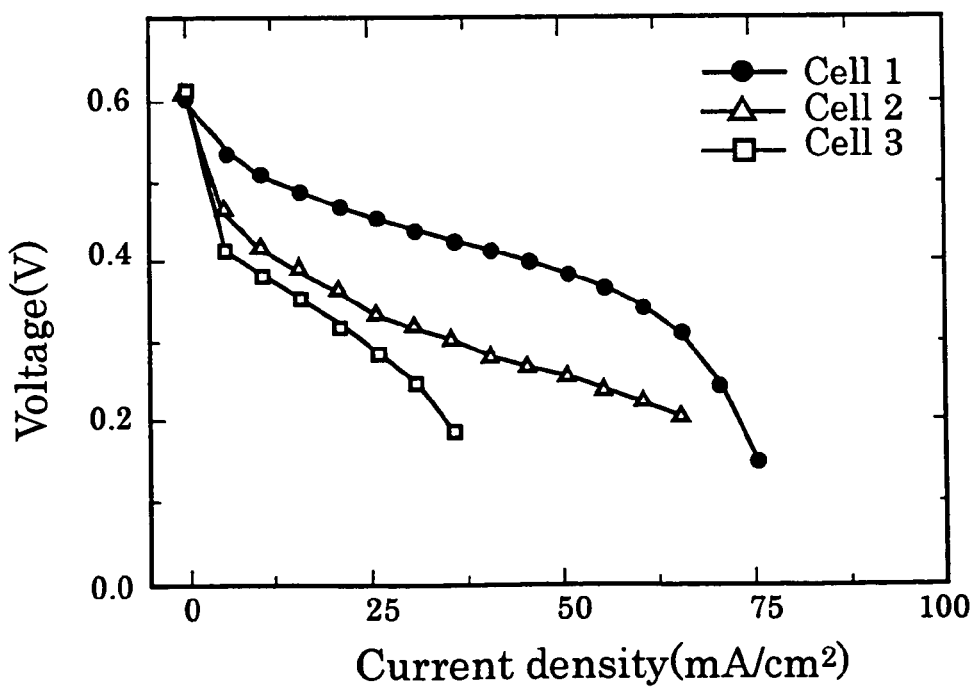
FIG. 13 is a graph showing I-V curves of the fuel cells 1, 2 and 3, respectively.
Figure 14:
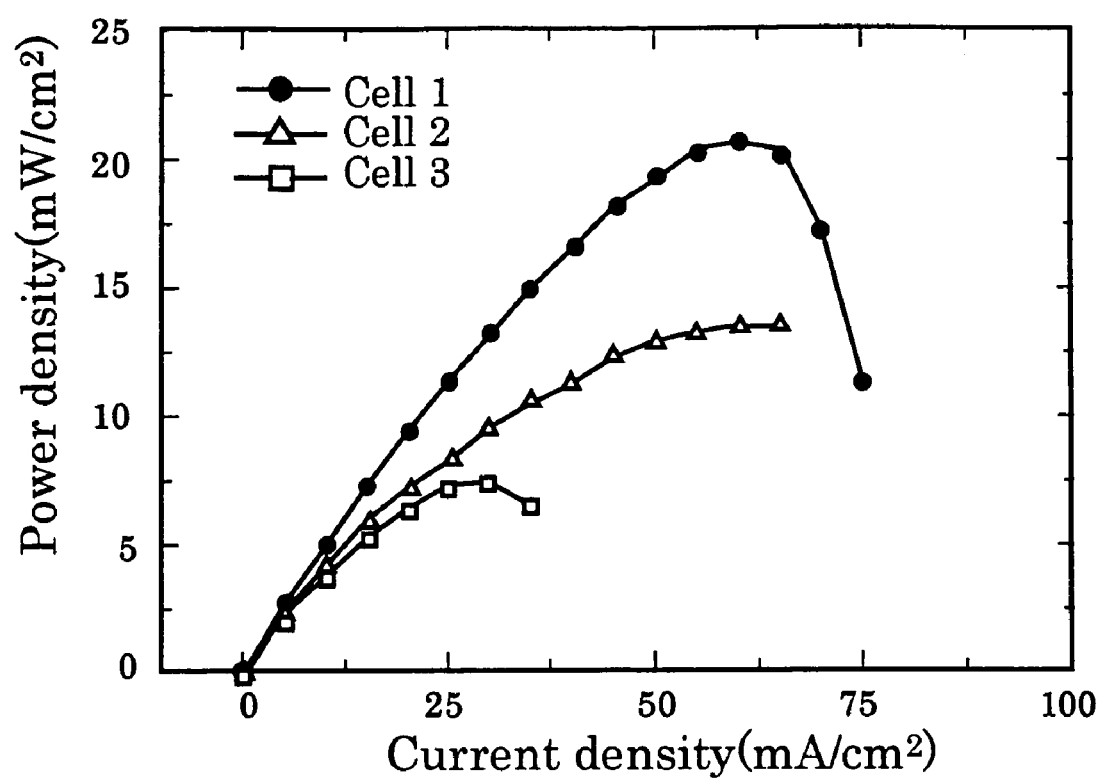
FIG. 14 is a graph showing current density dependency of output densities of the fuel cells 1, 2 and 3, respectively.

FIG. 13 shows the results of measurements of the I-V curves of the cells 1, 2 and 3, respectively, and the corresponding current density dependencies of the output current density are shown in FIG. 14. As is evident from the inspection results of the invention, the cell 1 had the highest performance. The cell 3 showed the worst performance, and the cell 2 showed an intermediate performance. Such differences were caused by the difference of damages suffered by the proton conductive electrolyte used for each cell. The cell 3 had suffered the largest damage among the three cells since it was immersed in the most concentrated aqueous methanol solution. The cell 2 had suffered small damage since it was immersed in a relatively small concentration of the aqueous methanol solution, and showed better performance than the cell 3. The cell 1 showed best performance without suffering from any damages. It is conjectured that the difference of the degree of damages is reflected on the mobility of the fuel within the proton conductive electrolyte that is related to the difference of performance.

Example 5

Inspection Apparatus 2

The cells of the fuel cells 1 to 3 were used in this example, in which a direct methanol fuel cell comprising 10 cells with an electrode area of 50 cm$^2$ were used by connecting in series. An aqueous methanol solution with a concentration of 2M was introduced at the anode side of each cell at a flow rate of 0.6 ml/minute. Air was introduced into the cathode side of each cell at a flow rate of 2000 ml/minutes. The flow rate of air was adjusted using a commercially available mass flow controller. I was adjusted to 50 mA/cm$^2$, $\Delta$I was adjusted to 5 mA/cm$^2$, $T1_{min}$ was adjusted to 0.5, and $T1_{max}$ was adjusted to 3. All the current flowing in 10 cells was changed from 50 mA/cm$^2$ to 55 mA/cm$^2$. Voltage changes of the sixth cell (abbreviated as cell 6 hereinafter) and eighth cell (abbreviated as cell 8 hereinafter) were sensed. A commercially available light bulb was used for the indicator, and the light bulb was adjusted so that it blinks when T1 is out of the prescribed range. Other indicators available include a buzzer or ring, a LED or lamp, a vibrator, or a smelling device, or a combination thereof. The indicator is not always required.

Figure 17:
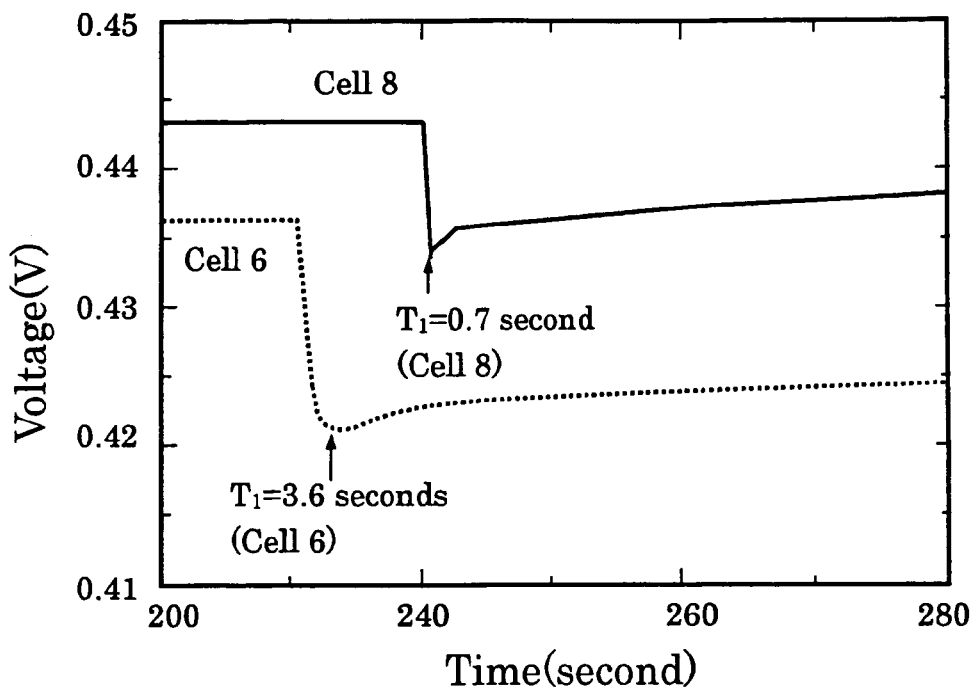
FIG. 17 is a graph showing the time dependent changes of the voltages of fuel cells 6 and 8, respectively, before and after changing the load current.
Figure 19:
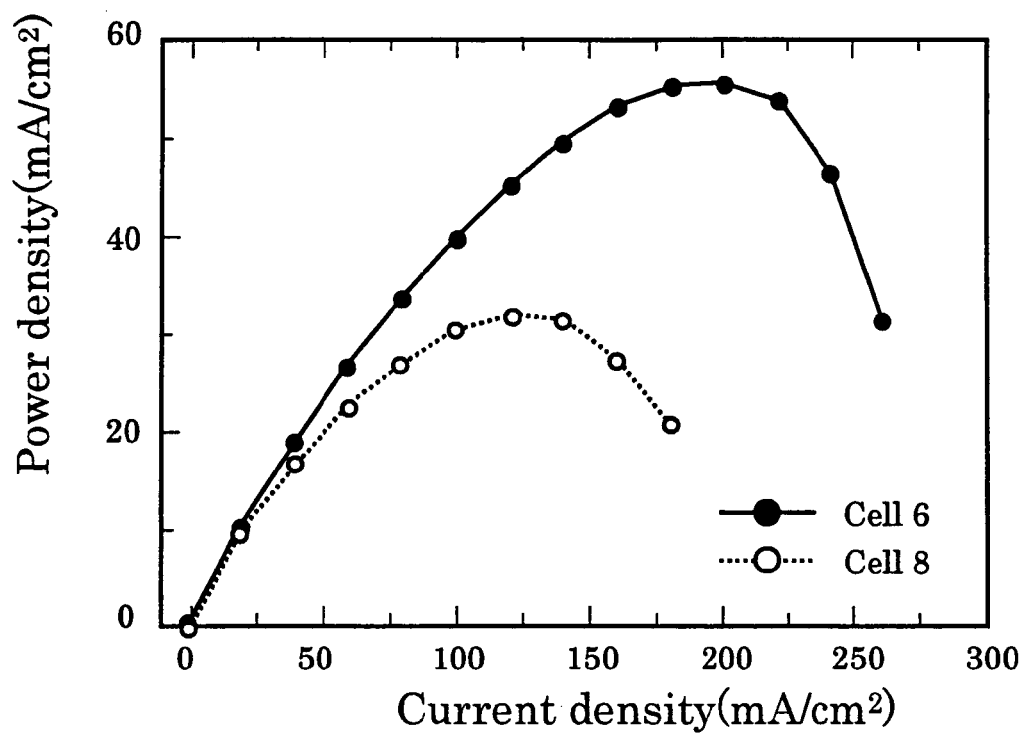
FIG. 19 is a graph showing the current density dependencies of the output current density in another example of the invention.

FIG. 17 shows the time dependent change of the voltage. The cell 6 was decided to be defective, while the cell was decided to be good from these results. Referring to the I-V curve, it was shown that the performance of cell 6 was poor as compared with cell 8 as was indicated by the inspection results. The result is shown in FIG. 18. While FIG. 19 shows the current density dependency of the output current density, the maximum output current density is largely different between cell 8 and cell 6.

While the catalyst was used by being supported on the carbon black supports, the catalyst may be supported on other supports such as titanium oxide, may be used without being supported on any supports. While Nafion 20092 made by DuPont Co. was used as the proton conductive electrolyte, examples of the electrolytes available in the invention include other perfluorocarbon sulfonic acids (a membrane made by Dow Chemical Co., Aciplex made by Asahi Chemical Co., and Flemion made by Asahi Glass Co.), sulfonated trifluorostyrene polymer, graft polymerization electrolytes prepared by introducing sukfonated polystyrene graft side chains into a ETFE•FEP base material, sulfonated styrene-butadiene random block copolymer, acid dope polybenzimidazole, sulfonated heat resistant polymers (sulfonated polyetherether ketone, polyether sulfone, polyphenyl quinoxalene, polybenzimidazole, and fluorinated polyimide), and ion conductive resin ion containing conductive vinyl monomers (sodium vinylsulfonate, sodium alsulfonate, 2-acrylamide-2-methylpropane sulfonic acid). The present invention is also effective in the fuel cell generator in which other fuels such as ethanol, diethylether, dimethoxymethane, formaldehyde, formic acid, methyl formate, methyl orthoformate, trioxane, 1-propanol, 2-propanol, 3-propanol, ethyleneglycol, glyoxal, glycerin and aqueous solutions thereof are introduced to the anode side. The inspection method and inspection apparatus of the invention, and the cell comprising the inspection method of the invention are effective not only in the fuel cell generator, but also in secondary batteries such as a nickel hydrogen secondary battery comprising a hydrogen occlusion electrode mainly comprising a hydrogen occlusion alloy for electrochemically occluding and discharging hydrogen and a nickel electrode mainly comprising nickel; and a lithium ion secondary battery comprising positive and negative electrodes that irreversibly occlude and discharge lithium ions, and an organic electrolyte solution in which an electrolyte containing lithium ions are dissolved, while the positive electrode and negative electrode are disposed with interposition of a separator.

As described above, the inspection method and inspection apparatus of the invention enable simple and objective inspections of the performance and transient response of the fuel cell. The direct fuel cell generator of the invention permits a generator comprising an inspection apparatus for deciding the performance of the cell and being controlled with high accuracy to be provided.

What is claimed is:

1. A direct liquid fuel cell generator comprising:
a fuel cell,
wherein the fuel cell comprises a plurality of cells, each comprising an anode electrode comprising an anode catalysis layer, a cathode electrode comprising a cathode catalyst layer, and an electrolyte disposed between the anode electrode and the cathode electrode, for power generation by supplying a liquid fuel to the anode electrode and an oxidant gas to the cathode electrode;
a load connected to an output from the direct liquid fuel cell generator to consume output power thereof; means connected to the output from the direct liquid fuel cell generator, for changing an output current density by controlling the load;
means for measuring an output voltage from the direct liquid fuel cell generator; and
a decision device connected to the current density control means and voltage detection means, for discriminating the condition of the fuel cell generator from the initiation time of the current density change, and from the measured results of the change of the output voltage,
wherein a validity of the fuel cell is decided based on an observation result of time dependent changes of the voltage V of one cell which is caused by generating a current density change $\Delta$I or $-\Delta$I ($\Delta$I in mA/cm$^2$ unit represents a positive value) satisfying the condition of $0.2 \leq \Delta I \leq 10$ in a current density I (mA/cm$^2$), which is taken out from an arbitrary number of cells connected in series constituting the direct liquid fuel cell generator under power generation, during a time interval $\Delta$t (sec) satisfying the condition of $10^{-5} \leq \Delta t \leq 0.5$.

2. The direct liquid fuel cell generator according to claim 1, wherein the load connected to the direct liquid fuel cell generator comprises at least two loads.

3. The direct liquid fuel cell generator according to claim 1, wherein the liquid fuel is an aqueous solution of at least one of organic compound selected from methanol, ethanol, diethylether, dimethoxyethane, formaldehyde, formic acid, methyl formate, methyl othoformate, trioxane, 1-propanol, 2-propanol, 3-propanol, ethyleneglycol, glyoxal, glycerin and combinations thereof.

4. The direct liquid fuel cell generator according to claim 3, wherein the liquid fuel is an aqueous methanol solution.

5. The direct liquid fuel cell generator according to claim 1, wherein $\Delta I$ or $-\Delta I$ ($\Delta I$ in mA/cm$^2$ unit represents a positive value) satisfies the condition of $0.2 \leq \Delta I \leq 5$ in a current density I (mA/cm$^2$).

6. The direct liquid fuel cell generator according to claim 1, wherein $\Delta I$ or $-\Delta I$ ($\Delta I$ in mA/cm$^2$ unit represents a positive value) satisfies the condition of $0.2 \leq \Delta I \leq 2$ in a current density I (mA/cm$^2$).

7. The direct liquid fuel cell generator according to claim 1, wherein the time interval $\Delta t$ (sec) satisfies the condition of $10^{-5} \leq \Delta t \leq 2 \times 10^{-3}$.

8. The direct liquid fuel cell generator according to claim 5, wherein the time interval $\Delta t$ (sec) satisfies the condition of $10^{-5} \leq \Delta t \leq 2 \times 10^{-3}$.

9. The direct liquid fuel cell generator according to claim 6, wherein the time interval $\Delta t$ (sec) satisfies the condition of $10^{-5} \leq \Delta t \leq 2 \times 10^{-3}$.

10. The direct liquid fuel cell generator according to claim 1, wherein the anode catalysis layer comprises ruthenium.

11. The direct liquid fuel cell generator according to claim 1, wherein the anode catalysis layer comprises platinum and ruthenium.

12. The direct liquid fuel cell generator according to claim 1, wherein the cathode catalyst layer comprises platinum.

13. The direct liquid fuel cell generator according to claim 1, wherein the cathode catalyst layer comprises platinum, and
wherein the anode catalysis layer comprises platinum and ruthenium.

14. The direct liquid fuel cell generator according to claim 3, wherein the cathode catalyst layer comprises platinum, and
wherein the anode catalysis layer comprises platinum and ruthenium.

15. The direct liquid fuel cell generator according to claim 4, wherein the cathode catalyst layer comprises platinum, and
wherein the anode catalysis layer comprises platinum and ruthenium.

16. The direct liquid fuel cell generator according to claim 2, wherein the at least two loads comprise
an external load for stationary consumption of the output electric power from the direct liquid fuel cell generator, and
an inspection load for generating a current density change.

* * * * *